US005777216A

United States Patent [19]

Van Duyne et al.

[11] Patent Number: 5,777,216

[45] Date of Patent: Jul. 7, 1998

[54] IGNITION SYSTEM WITH IONIZATION DETECTION

[75] Inventors: Edward Van Duyne, Ashland; Paul Porreca, Millis, both of Mass.

[73] Assignee: Adrenaline Research, Inc., Marlborough, Mass.

[21] Appl. No.: 595,558

[22] Filed: Feb. 1, 1996

[51] Int. Cl.$^6$ .................... G01M 15/00

[52] U.S. Cl. .................... 73/116; 73/35.08; 324/378; 324/382; 324/399

[58] Field of Search .................... 73/115, 116, 117.2, 73/117.3, 118.1, 35.08; 364/431.03; 324/378, 379, 380, 382, 393, 399, 402

[56] References Cited

U.S. PATENT DOCUMENTS

| | | | |
|---|---|---|---|
| 4,003,248 | 1/1977 | Leichle | 73/116 |
| 4,307,603 | 12/1981 | Dobler et al. | 73/115 |
| 4,359,893 | 11/1982 | Kizler et al. | 73/115 |
| 4,491,110 | 1/1985 | Bone et al. | 73/115 |
| 4,515,132 | 5/1985 | Anderson et al. | 73/115 |
| 4,547,734 | 10/1985 | Spaude . | |
| 4,716,874 | 1/1988 | Hilliard et al. . | |
| 5,197,448 | 3/1993 | Porreca et al. . | |
| 5,230,240 | 7/1993 | Ohsawa et al. | 73/116 |
| 5,272,914 | 12/1993 | Murata et al. | 73/116 |
| 5,309,884 | 5/1994 | Fukui et al. . | |
| 5,321,978 | 6/1994 | Brandt et al. | 73/116 |
| 5,337,716 | 8/1994 | Fukui . | |
| 5,347,855 | 9/1994 | Miyata et al. | 73/116 |
| 5,359,882 | 11/1994 | Fukui . | |
| 5,365,910 | 11/1994 | Miyata et al. | 73/116 |
| 5,377,653 | 1/1995 | Hamada et al. | 73/116 |
| 5,383,350 | 1/1995 | Bennett et al. . | |
| 5,392,641 | 2/1995 | McCombie . | |
| 5,396,176 | 3/1995 | Ishii et al. . | |
| 5,397,990 | 3/1995 | Ohsawa . | |

FOREIGN PATENT DOCUMENTS

| | | |
|---|---|---|
| 2 675 206 | 4/1991 | France . |

OTHER PUBLICATIONS

"Flame Ion Density Measurement Using Spark Plug Voltage Analysis" Miyata et al., *International Congress and Exposition*, Detroit, Michigan (Mar. 1–5, 1993).

"Investigation of In–cylinder Fluid Motion Using a Head Gasket Intrumented with Ionization Probes" Witze et al., *International Congress and Exposition* , Detroit, Michigan (Feb. 25–Mar. 1, 1991).

"Detection of Abnormal Flame Fronts in Road Tests with an Engine Using Independent Ionization Gaps" Landis, *SAE Summer Meeting*, Atlantic City, New Jersey (Jun. 6–11, 1954).

"A Flame Ionization Technique for Measuring Total Hydrcarbons in Diesel Exhaust" Johnson et al., *International Harvester Company*.

"Diesel Exhaust Hydrocarben Measurement—A Flame–Ionization Method" Spinger et al., *Automotive Engineering Congress*, Detroit, Michigan (Jan. 12–16, 1970).

"A Recommended Flame Ionization Detector Procedure for Automotive Exhaust Hydrocarbons" Teague et al., *SAE Mid–Year Meeting*, Detroit, Michigan (May 18–22, 1970).

"Turbulent Flame Structure as Determined by Pressure Development and Ionization Intensity" Arrigoni et al., *International Automotive Engineering Congress*, Detroit Michigan (Jan. 8–12, 1973).

(List continued on next page.)

*Primary Examiner*—George M. Dombroske
*Attorney, Agent, or Firm*—Choate, Hall & Stewart

[57] ABSTRACT

Provided is a high power ignition system for internal combustion engines with a detection circuit for sensing and measuring ionization in a spark plug gap. The detection circuit utilizes a dual-purpose second energy source to apply the voltage necessary to generate a high current arc and then an ionization current. A signal processor analyzes an ionization signal created by the detection circuit to derive useful ignition system data such as engine misfire, combustion duration, engine knocking, approximate air/fuel ratio, indications of spark plug fouling, and preignition.

19 Claims, 3 Drawing Sheets

OTHER PUBLICATIONS

"Chemi–Ionization and Carbon in a Spark Ignition Engine" Arrigoni et al., *Automotive Engineering Congress*, Detroit Michigan (Feb. 25–Mar. 1, 1974).

"Significance of Burn Types, as Measured by Using the Spark Plugs as Ionization Probes, with respect to the Hydrocarbon Emission Levels in S.I. Engines" Rado et al., *Automotive Engineering Congress and Exposition*, Detroit, Michigan (Feb. 24–28, 1975).

"Optimization of a Flame Ionization Detector for Determination of Hydrocarbon in Diluted Automotive Exhausts" Reschke, *International Automotive Engineering Congress and Exposition*, Detroit, Michigan (Feb. 28–Mar. 4, 1977).

"Improving the Method of Hydrocarbon Analysis" Staab et al., *International Congress Exposition*, Detroit, Michigan (Feb. 23–27, 1981).

"Cycle by Cycle Variations of Flame Propagation in a Spark Ignition Engine" Petrovic, *International Congress and Exposition*, Detroit, Michigan (Feb. 22–26, 1982).

"In–Cylinder Measurement of Combustion Characteristics Using Ionization Sensors" Anderson, *International Congress and Exposition*, Detroit, Michigan (Feb. 24–28, 1986).

"Exhaust Gas Ionization Sensor for Spark Ignition Engines" Williams et al., *I Mech E*, C59/88, (1988).

"Ionization Sensors for Feedback Control of Gasoline Engines" Collings et al. (1988).

"An Exhaust Ionization Sensor for Detection of Late Combustion with EGR" Brehob, *International Fuels and Lubricants Meetings and Exposition*, Baltimore, Maryland (Sep. 25–28, 1989).

"Cycle–Resolved Multipoint Ionization Probe Masurements in Spark Ignition Engine" Witze, *International Fuels and Lubricants Meeting and Exposition*, Baltimore, Maryland (Sep. 25–28, 1989).

"In–Cylinder Measurement of Residual Gas Concentration in a Spark Ignition Engine" Galliot et al., *International Congress and Exposition*, Detroit, Michigan (Feb. 26–Mar. 2, 1990).

"Unburnt Hydrocarbon Measurement by Means of a Surface Ionisation Detector" Cai et al. (1991).

"Analysis of RF Corona Discharge Plasma Ignition" Van Voorhies et al. (1992).

"Flame Location Measurements in a Production Engine Using Ionization Probes Embodied in a Printed–Circuit–Board Head Gasket" Nicholson et al., *International Congress and Exposition*, Detroit, Michigan (Mar. 1–5, 1993).

"Simultaneous Application of Optical Spark Plug Probe and Head Gasket Ionization Probe to a Production Engine" Meyer et al., *International Congress and Exposition*, Detroit, Michigan (Mar. 1–5, 1993).

"Determining the Location of End–Gas Autoignition Using Ionizatio Probes Installed in the Head Gasket" Witze et al., *Fuels and Lubricants Meeting and Exposition*, Philadelphia, Pennsylvania (Oct. 18–21, 1993).

IGNITION SYSTEM WITH IONIZATION DETECTION

BACKGROUND OF THE INVENTION

This invention relates generally to ionization detection in an ignition system which employs two substantially decoupled energy sources. More particularly, this invention relates to an ignition system where the function of a first energy source is to generate a spark across a spark plug gap and the function of a second energy source includes delivering current to the plug gap and providing a voltage across the plug gap such that an ionization current results and can be detected and measured by a detection circuit.

The goal of any ignition system is to consistently ignite an air/fuel mixture such that a self-sufficient combustion process is initiated after the arcing has stopped. No ignition system, however, is perfect. These systems occasionally misfire and spark plugs foul. Measurements indicative of misfire, engine knock, air/fuel ratio, and spark plug fouling are useful, especially in light of government clean air initiatives and requirements. Such initiatives and requirements may include counting misfires, calculating misfire percentages, continuously monitoring the air/fuel ratio, and controlling engine variables with various feedback loops.

The relationship between spark plug gap ionization and engine misfire is well understood in the automotive industry. See S. Miyata, et al., "Flame Ion Density Measurement Using Spark Plug Voltage Analysis," SAE Technical Paper 930462. When the plug sparks, the gases around the plug are ionized. It is known that the electrical conductivity within a spark plug gap increases following successful ignition due to the ionization of hot combustion gases. Thus, voltage applied across the gap following ignition results in a current, specifically an ionization current. Measuring the ionization current provides information about the combustion process. Ionization current is known to indicate combustion. Low or zero current is likewise known to indicate a misfire. The occurrence of engine knock, approximate air/fuel ratios, spark plug fouling, and other combustion characteristics can also be derived from measurements of the ionization current.

Prior art detection circuits have utilized a variety of energy sources to generate an ionization current. However, the energy sources in these systems are typically coupled to the primary energy source which generates the spark. A high negative voltage results after discharge of the primary energy source to create the ensuing spark event. The presence of a high negative voltage makes measurement of the ionization current unreliable or requires the use of complicated signal processing components. U.S. Pat. No. 5,321,978 to Brandt et al. attempts to overcome some of these difficulties. Brandt et al. discloses an additional power source to create a voltage and generate an ionization current. It also discloses a negative voltage clamping means to limit the effect of negative voltages generated by the coil. Nevertheless, Brandt et al. has the limitation that the only function of the additional power supply is to provide voltage for generating an ionization current.

The Dual Energy Ignition System (disclosed in U.S. Pat. No. 5,197,448 to Porreca et al.) separates the ignition process into two phenomena, the spark and the arc. One of the main features of such an ignition system is its ability to extend the lean operating limit of spark-ignition engines. Lean operation or exhaust gas recirculation (EGR) leads to low emission levels and high thermal efficiency. This system includes a first and second energy source to create the two phenomena. The first energy source is electrically connected to a spark gap in such a way that energy released from the first energy source provides high voltage to the spark gap for creating the spark. The second energy source is electrically connected with the spark gap in such a way that coupling between the second energy source and the first energy source is minimized, but also in such a way that energy released from the second energy source provides high current to the spark gap via a low impedance path, the energy being of sufficient strength to sustain an arc across the spark gap.

One object of the current invention is to efficiently and economically detect ionization in a spark gap by inducing and measuring the ionization current across the spark gap. Analysis of the ionization current provides useful data regarding characteristics of combustion such as misfire, engine knock, approximate air/fuel ratio, and spark plug fouling. Another object of this invention is to store this data for future use. Yet another object of this invention is to utilize a second energy source, such as that in the Dual Energy Ignition System, to provide the voltage across the spark gap. In particular, this invention utilizes a second energy source for at least two functions, one of which is supplying arc current, the other of which is subsequent application of voltage across the spark gap which generates the ionization current. Still another object of this invention is efficient operation with the Dual Energy Ignition System, thereby reducing the number of components for ionization current measurement, simplifying the measurement process, providing increased data accuracy, and maintaining efficient operation of the ignition system.

SUMMARY OF THE INVENTION

It is a general object of the present invention to provide a simple method and circuit to detect ionization and measure ionization current. Efficiency and economy are achieved over the prior art by utilizing an additional energy source for two distinct functions.

The present invention is an ionization detection circuit which utilizes a second energy source in an ignition system containing a first and second energy source. Coupling between the energy sources is minimized. The first energy source provides energy for a spark across the spark plug gap. The second energy source, which is decoupled from the first energy source, provides energy for an arc across the spark plug gap immediately after the spark breakdown. Subsequent to providing the arc, the second energy source is recharged to apply a voltage across the spark gap. This applied voltage results in an ionization current through the spark plug gap. Detection and measurement of the ionization current provides information about the combustion process such as occurrence of partial ignition or misfire, engine knocking, approximate air/fuel ratio, and spark plug performance.

In accordance with the present invention, the Dual Energy Ignition System, having a first and second energy source, is adapted to include a detection circuit for measuring ionization in a spark plug gap. Adaptation of the Dual Energy Ignition System according to the present invention provides efficient and economical ionization measurement, while maintaining all of the advantages inherent in the Dual Energy Ignition System.

In the preferred embodiment, the detection circuit includes a resistor through which the ionization current flows. The resulting voltage drop provides an ionization signal, indicative of ionization, which is filtered and analyzed by a processor and combustion characteristics are thereby derived. The processor analyses may be stored for future use. The circuit further includes a zener diode which allows the arc current to bypass the resistor and also provides protection for the detection circuit from excess voltage during arc discharge. The zener diode also allows for greater measurement accuracy and ignition efficiency. Few additional parts are required and accurate measurement is inherent.

DESCRIPTION OF THE PREFERRED EMBODIMENT

The present invention generates, detects and measures ionization current across a spark plug gap in an ignition system. A system for optimizing the ignition process separates ignition into two phenomena, a spark and an arc. Ignition efficiency, combustion emissions levels, and thermal efficiency are improved by dedicating a separate energy source to each part of the ignition process. According to the present invention, ionization current is created by utilizing one of the energy sources to apply a voltage to the spark plug gap. The ionization current is measurable and characteristics of the combustion process are determined.

Figure 1:
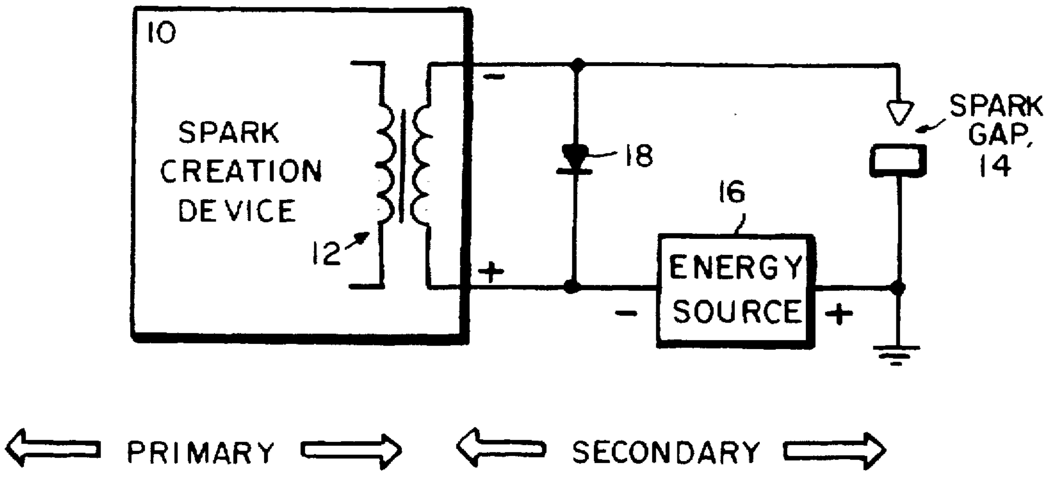
FIG. 1 PRIOR ART
FIG. 1 is a conceptual diagram of a prior art dual energy ignition system comprising a spark creation device, a second energy source, and a high-voltage diode to decouple the second energy source from the primary.

FIG. 1 depicts a conceptual illustration of the prior art Dual Energy Ignition System, as disclosed in U.S. Pat. No. 5,197,448 to Porreca et al. and incorporated in full herein by reference. A spark creation device 10, including a voltage amplifying transformer 12, has the sole purpose of creating a spark in a spark gap 14. A second energy source 16 has the sole purpose of creating a high current arc in the spark gap 14. Importantly, the second energy source 16 has a discharge path to the spark gap 14 which is uncoupled from the primary side of the transformer 12. This can be achieved via a high-voltage diode 18. This could also be achieved by eliminating the high-voltage diode 18 and using a saturatable core transformer in place of transformer 12. The efficiency of such a system is improved over pre-existing systems because arc energy is not transferred through an inefficient transformer and the second energy source is not charged with energy from the spark creation device 10. It is important that the energy released from the secondary energy source is coupled to the spark gap 14 via a low impedance path.

Figure 2:
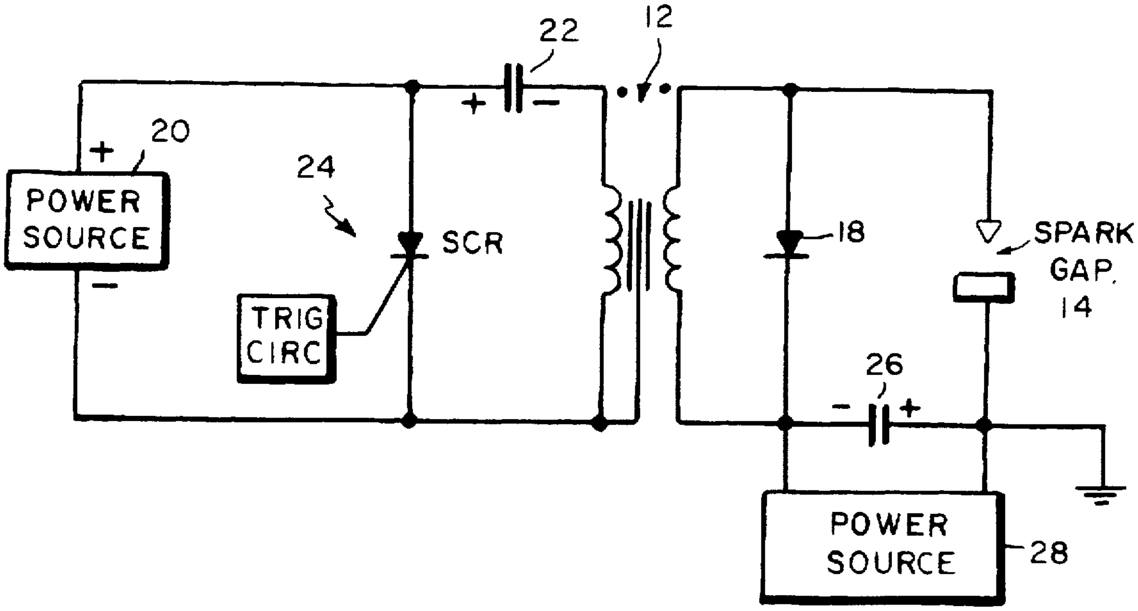
FIG. 2 PRIOR ART
FIG. 2 is a circuit diagram of a prior art dual energy ignition system.

With reference to FIG. 2, there is shown a prior art circuit diagram of a preferred embodiment of the Dual Energy Ignition System. A first power source 20 charges a capacitor 22. A capacitor with an extremely low internal inductance and an extremely low internal resistance should be used, such as those commonly used in CDI or strobe light applications. A trigger circuit 24 including a high voltage, high peak current switching device is preferably used to trigger the discharge of the capacitor 22 through the transformer 12. This rapid discharge induces a very high voltage on the secondary winding of the transformer 12. This voltage ionizes the matter surrounding the spark gap 14 and creates the spark.

On the secondary side of the transformer 12 is a second power source 28 which charges a capacitor 26. The energy stored in capacitor 26 will discharge and result in an arc through the spark gap 14 after a spark has been formed. A high-voltage diode 18 is used to insure that the discharge of the capacitor 26 is not coupled to the primary side of the transformer 12.

The outputs of the power sources 20 and 28 need not be identical. In typical embodiments, the power sources 20 and 28 will include DC to DC converters for converting the voltage provided by the automobile (generally 14 volts) to the high voltages required in an ignition system.

Figure 3:
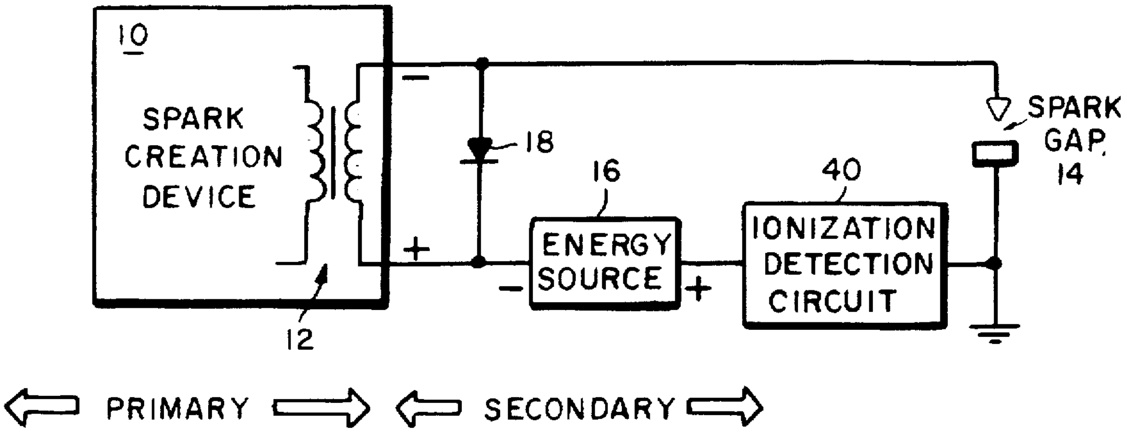
FIG. 3 is a conceptual diagram of the ignition system with ionization detection according to the present invention.

FIG. 3 depicts a conceptual illustration of an ignition system with ionization current sensing according to the present invention. The spark creation device 10, including the voltage amplifying transformer 12, has the sole purpose of creating a spark in spark gap 14. An ionization detection circuit 40 utilizes energy source 16 to create and detect the ionization current in the spark gap 14.

Figure 4:
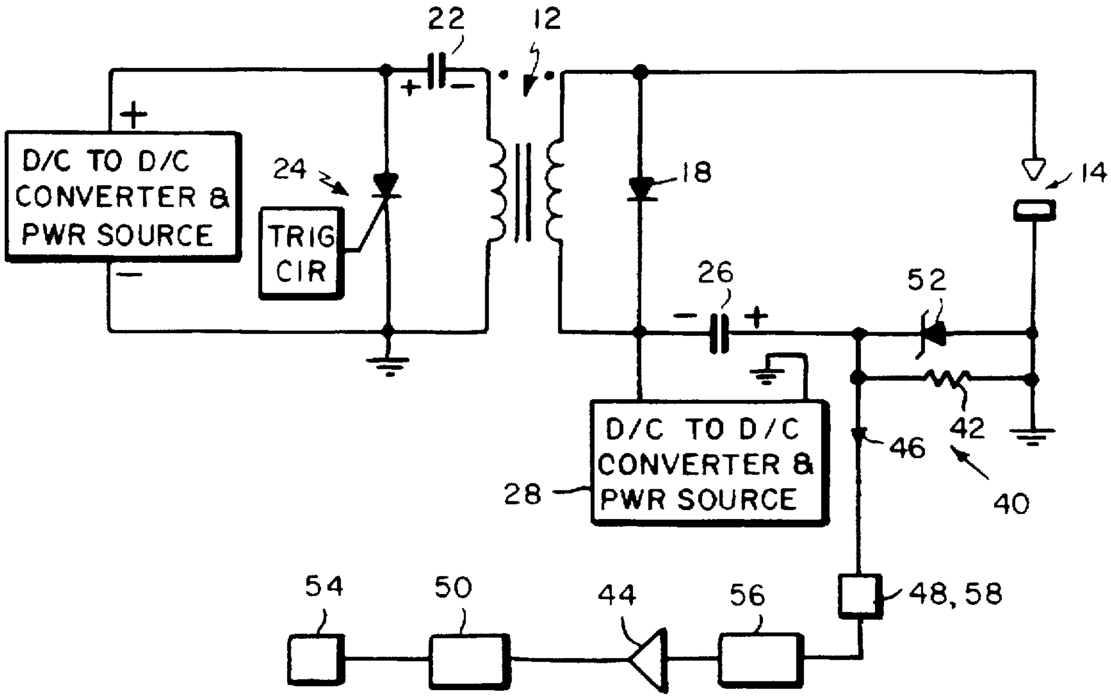
FIG. 4 is a circuit diagram of the ignition system with ionization detection according to the present invention.

The ionization detection circuit 40 of the present invention is illustrated in FIG. 4. The detection circuit 40 utilizes the energy stored in capacitor 26 as the voltage source for the ionization current.

The detection circuit 40 comprises a resistor 42, the spark gap 14, the high-voltage diode 18, and the capacitor 26. After the spark and the arc occur, the capacitor 26 is quickly re-biased by the second power source 28. The energy stored in the re-biased capacitor 26 provides a voltage across the spark gap 14. Any current which results is termed the ionization current, and it is a function of the ionization present in the spark gap 14. If the current exceeds certain threshold, then combustion occurred. If the threshold is not reached, then partial combustion or a misfire occurred.

The ionization current is measured via the voltage across the resistor 42. This voltage drop provides an ionization signal 46. Problems occur when trying to analyze ionization signal 46 because of noise during charging capacitor 26 and DC bias across resistor 42 during discharging capacitor 26. Being selective as to when to "pay attention" to the voltage across resistor 42 is a solution to both problems. An analog multiplexer 58 can supply the proper DC bias to a high pass filter 56 most of the time. The analog multiplexer 58 then supplies the ionization signal 46 to the high pass filter 56 during the combustion process. Therefore, the noise and the DC bias are removed from the ionization signal 46 before entering an amplifier 44. Another method of eliminating the noise is to use a low pass filter 48 in addition to or in place of the multiplexer 58. Once amplified by amplifier 44, a signal processor 50 analyzes the ionization signal 46 to determine various characteristics of the combustion process, including detection of misfire. A memory unit 54 stores the analysis data from the processor 50 for future use.

Further included in the detection circuit 40 is a zener diode 52. The zener diode 52, in parallel with the resistor 42, is important for two reasons. First, because the arc current is relatively large, accurate measurement of the small ionization bleed current can be difficult. The zener diode 52 serves to limit the voltage drop across the resistor 42. This protects the amplifier circuit and also allows a higher/more sensitive resistor 42 to be used, thereby providing for better measurement of the ionization signal 46.

Second, and more importantly, the zener diode 52 bypasses the resistor 42 providing a low impedance path for the arc current discharged from the capacitor 26. This is necessary for efficient operation of the ignition system. Without the zener diode 52 the arc current would face a significant impedance caused by the resistor 42. It is highly desirable to minimize the circuit impedance, so as to maximize the peak current and the arc intensity across the spark gap 14.

Referring to FIG. 4, circuit component values will be provided for an illustrative embodiment. In this embodiment, the 0.47 μF capacitor 22 is charged to 600 volts by the first power source 20 which includes a 14 volt to 600 volt DC to DC convertor. The trigger circuit 24 includes a 1000 volt 35 amp SCR (a device common to CDI and strobe circuits). The step-up transformer 12 has a winds ratio of 1:100.

On the secondary side of transformer 12 of this illustrative embodiment, the 0.47 μF capacitor 26 is charged to −600 volts by the second power source 28 which includes a 14 volt to −600 volt DC to DC convertor. The high-voltage diode 18 is rated at 40,000 volts and 1 amp. The 3.3 volt zener diode 52 in parallel with the 1 kΩ resistor 42 serves to limit voltage drop across the resistor 42 to 3.3 volts.

For the purpose of electromagnetic interference (EMI), shielding is preferably utilized. Also, components are preferably placed close to the spark plug to shorten the high current, EMI generating discharge path (antenna).

Characteristics of the combustion process other than misfire can be determined from the ionization signal 46. One simple example is the duration of combustion, which is simply how long the ionization signal 46 exceeds a certain threshold. Another example is engine knock. Engine knock occurs when combustion exceeds the speed of sound. Engine knock is a sound wave in the 5–8 KHz range and it can be detected in the ionization signal 46. The processor 50 can be used to isolate and analyze ionization signal waves in the 5–8 KHz range. Presence of such waves indicate that engine knock is has occurred. This processor analysis data may also be stored in the memory unit 54.

Another example of a combustion process characteristic that can be derived from the ionization signal 46 is the air/fuel ratio. There is a correlation between ionization and air/fuel ratios. See S. Miyata, et al., Flame Ion Density Measurement Using Spark Plug Voltage Analysis, SAE Technical Paper 930462. The duration of the ionization measurement and the rate of ionization signal 46 decay provide an indication of air/fuel ratio. Therefore, ignition system testing yields a reference curve correlating ionization levels to various air/fuel ratios for particular engine designs. By providing the processor 50 with these correlation data, the processor 50 can analyze the ionization signal 46 and derive an approximate air/fuel ratio. Again, this may be stored for future use in memory unit 54.

Two additional examples of characteristics of combustion determinable from the ionization signal 46 are spark plug fouling and preignition. These characteristics are indicated by the presence of ionization currents during certain engine cycles where combustion is not supposed to occur. In particular, spark plug fouling is indicated when the ionization signal 46 persists for too long. The other characteristic, preignition, occurs when combustion begins before the ignition has fired. Thus, if the ionization signal 46 indicates combustion before sparking has occurred, preignition is indicated. Once again, the manifestation of these characteristics may be stored for future use in memory unit 54.

Another useful measurement is engine angular position. Means for providing this data is well-known to those skilled in the internal combustion engine art. Engine angular position provides a reference point for processor data derived from the ionization signal 46. For example, when engine knock is detected (via the analyzed ionization signal 46) there is a corresponding engine angular position. If the corresponding engine angular position is also stored in the memory unit 54 along with the engine knock analysis, a technician can later utilize this information for engine repair, adjustment and the like. Similar angular position information corresponding to misfire, combustion duration, engine knocking, air/fuel ratio, and preignition is likewise a useful diagnostic tool.

Furthermore, once the engine angular position is determined, the angular position of peak pressure can be approximated because it closely corresponds to the peak of the ionization signal 46. An approximation of the position of peak pressure is very useful for optimizing two engine efficiency parameters. First, in order to generate the optimal (greatest) torque from a given amount of fuel, the peak pressure in the combustion chamber should occur approximately between 10 and 15 degrees after top dead center (TDC). Second, to lower the temperature of combustion and to lower $NO_x$ emissions, the peak pressure should occur after 15 degrees TDC. This allows for the possibility of emissions control using the ionization signal 46.

Figure 5A:
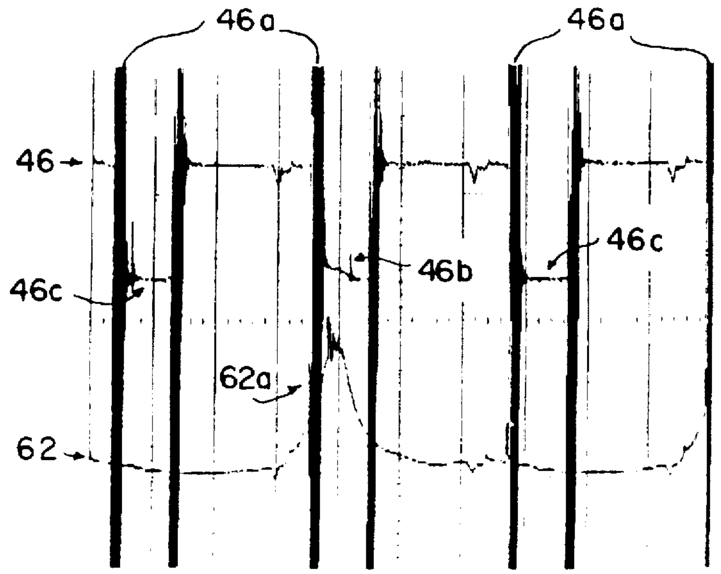
FIGS. 5*a* and 5*b* are graphs of experimental data showing measurements of ionization current and indications of misfire according to the present invention.
Figure 5B:
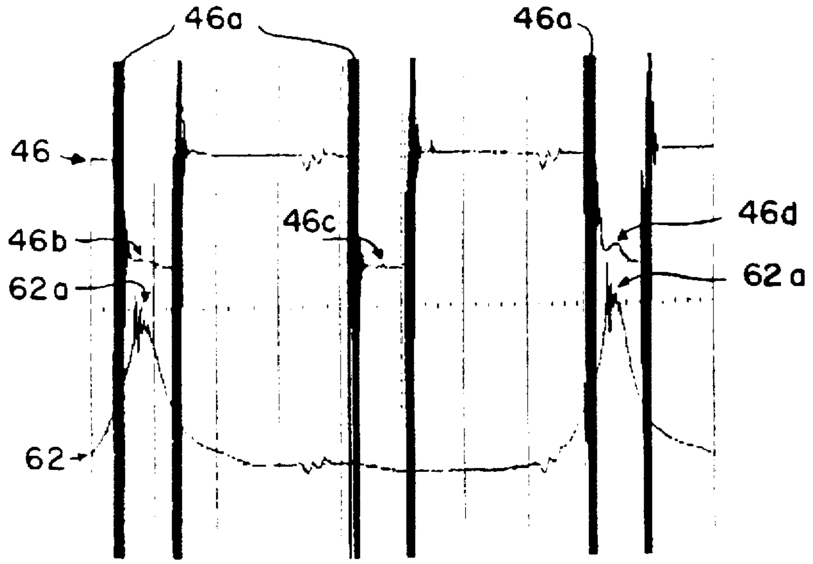

FIGS. 5*a* and 5*b* graphically illustrate some experimental results from the present invention. These graphs show concurrent measurements of cylinder pressure 62 and the ionization signal 46. Rises in the cylinder pressure, at points 62*a*, indicate the that combustion has occurred. The concurrent ionization signal 46 indicates the occurrence of various characteristics of combustion. For example, the occurrence of a spark and subsequent recharging is shown at 46*a*. The occurrence of combustion is shown at 46*b*. The occurrence of misfire is indicated at 46*c*. Finally, combustion with knocking is indicated at 46*d*.

What is claimed is:

1. An ignition system with ionization detection comprising:

a step-up transformer having a primary and secondary winding;

a first energy source electrically connected to the primary winding;

a spark gap electrically connected with the secondary winding in such a way that energy released from the first energy source creates a spark across the gap;

a second energy source electrically connected with the spark gap and secondary winding, the second energy source being substantially decoupled from the first energy source and providing energy to the spark gap via a low impedance path thereby sustaining an arc across the spark gap; and an ionization detection circuit which utilizes the second energy source to supply voltage across the spark gap, the detection circuit measuring the resulting ionization current through the spark gap and providing an ionization signal.

2. The system of claim 1 wherein the detection circuit comprises a resistor electrically connected in series with the second energy source, whereby the voltage drop across the resistor provides the ionization signal.

3. The system of claim 2 further including a high-pass filter to eliminate DC bias from the ionization signal.

4. The system of claim 2 further including a low-pass filter to eliminate high frequency noise from the ionization signal.

5. The system of claim 3 or claim 4 wherein the detection circuit further comprises an amplifier to boost the ionization signal.

6. The system of claim 2 wherein the detection circuit further comprises a zener diode electrically connected in parallel with the resistor, whereby the sustained arc substantially bypasses the resistor.

7. The system of claim 1 further including a processor which performs an analysis of the ionization signal to determine occurrence of a misfire.

8. The system of claim 1 further including a processor which performs an analysis of the ionization signal to determine occurrence of engine knocking.

9. The system of claim 1 further including a processor which performs an analysis of the ionization signal to determine approximate air/fuel ratio.

10. The system of claim 1 further including a processor which performs an analysis of the ionization signal to determine indications of spark plug fouling.

11. The system of claim 1 further including a processor which performs an analysis of the ionization signal to determine occurrence of preignition.

12. The system of claim 1 further including a processor which performs an analysis of the ionization signal to determine combustion duration.

13. The system of claim 7, 8, 9, 10, 11 or 12 further including a memory unit which stores processor analyses for future use.

14. The system of claim 7, 8, 9, 10, 11 or 12 further including a measuring device which determines engine angular position, the processor analyzing the angular position with respect to the ionization signal, and a memory unit which stores the processor analyses for future use.

15. The system of claim 1 further including a measuring device which determines engine angular position.

16. The system of claim 14 further including a memory unit which stores the engine angular position for future use.

17. The system of claim 15 further including a processor which performs an analysis of the ionization signal and the engine angular position to determine the position of peak pressure.

18. The system of claim 17 further including a memory unit which stores the position of peak pressure for future use.

19. The system of claim 1 further including a memory unit which stores the ionization signal for future use.

* * * * *